United States Patent
Jambou

(10) Patent No.: US 10,394,437 B2
(45) Date of Patent: Aug. 27, 2019

(54) CUSTOM WIDGETS BASED ON GRAPHICAL USER INTERFACES OF APPLICATIONS

(71) Applicant: International Business Machines Corporation, Armonk, NY (US)

(72) Inventor: Emmanuel Jambou, Saint Maur des Fossés (FR)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 15/213,518

(22) Filed: Jul. 19, 2016

(65) Prior Publication Data
US 2018/0024730 A1 Jan. 25, 2018

(51) Int. Cl.
*G06F 3/0482* (2013.01)
*G06F 3/0484* (2013.01)
*G06F 3/0485* (2013.01)

(52) U.S. Cl.
CPC ........ *G06F 3/04847* (2013.01); *G06F 3/0482* (2013.01); *G06F 3/04855* (2013.01)

(58) Field of Classification Search
CPC . G06F 3/0482; G06F 3/04847; G06F 3/04855
See application file for complete search history.

(56) References Cited

U.S. PATENT DOCUMENTS

| | | | | |
|---|---|---|---|---|
| 8,239,781 B2* | 8/2012 | Taylor | ................. | G06F 9/543 |
| | | | | 705/7.11 |
| 8,519,972 B2 | 8/2013 | Forstall et al. | | |
| 2006/0277460 A1 | 12/2006 | Forstall et al. | | |
| 2010/0077344 A1* | 3/2010 | Gaffney | ................ | G06F 3/0481 |
| | | | | 715/788 |
| 2010/0305999 A1 | 12/2010 | Fujioka | | |
| 2012/0071208 A1* | 3/2012 | Lee | .................. | H04M 1/72544 |
| | | | | 455/566 |
| 2012/0240054 A1* | 9/2012 | Webber | ............... | G06Q 10/107 |
| | | | | 715/752 |
| 2014/0009394 A1* | 1/2014 | Lee | ...................... | H04N 5/4403 |
| | | | | 345/157 |
| 2015/0058744 A1 | 2/2015 | Dhingra et al. | | |
| 2015/0177943 A1* | 6/2015 | Park | ...................... | G06F 3/0486 |
| | | | | 715/769 |
| 2017/0223176 A1* | 8/2017 | Anzures | .............. | G06F 3/04883 |
| 2018/0059914 A1* | 3/2018 | Louch | ................ | G06F 3/04842 |

OTHER PUBLICATIONS

Benjamin Van Ryseghema, Et Al.: "Seamless Composition and Reuse of Customizable User Interfaces With Spec", Science Computer Programming, vol. 96, Part 1, Dec. 15, 2014.

* cited by examiner

*Primary Examiner* — Tan H Tran
(74) *Attorney, Agent, or Firm* — Patterson + Sheridan, LLP

(57) ABSTRACT

Systems, methods, and computer program products to perform an operation comprising receiving input specifying a first portion of a graphical user interface (GUI) of a first application executing on a first computing device, wherein the GUI is outputted on a display device, rendering the GUI of the first application on a first virtual display of the first computing device, and not on the first display device, and generating a first widget which displays the first portion of the GUI of the first application on the display device, wherein a unique identifier of the first widget is associated with a unique identifier of the first virtual display.

11 Claims, 9 Drawing Sheets

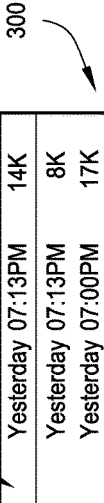
FIG. 3A
FIG. 3B

US 10,394,437 B2

CUSTOM WIDGETS BASED ON GRAPHICAL USER INTERFACES OF APPLICATIONS

BACKGROUND

The present invention relates to computer software, and more specifically, to computer software which provides custom widgets based on the graphical user interfaces of applications.

Software developers may include widgets as an additional feature in a software application package. The widgets may be trimmed down versions of the application's graphical user interface (GUI) and overall functionality, providing the user a set of application functionalities in a more compact package, thereby saving space on a display. For example, a widget for a media player may provide "remote control" buttons which allow the user to play, stop/pause, fast forward, and rewind multimedia files. Since these remote control buttons take up relatively little screen space, the widget can often occupy less screen space than the full-screen media player.

SUMMARY

According to one embodiment, a method comprises receiving input specifying a first portion of a graphical user interface (GUI) of a first application executing on a first computing device, wherein the GUI is outputted on a first display device and wherein the specified first portion is less than the entire GUI, rendering the GUI of the first application on a first virtual display of the first computing device, removing, based on the rendering, the GUI of the first application from the first display device, and generating a first widget which displays the first portion of the GUI of the first application on the first display device, wherein the first widget includes one or more interactive elements that expose an underlying functionality of the first portion of the GUI.

According to another embodiment, a system comprises one or more computer processors, and a memory containing a program which when executed by the processors performs an operation comprising receiving input specifying a first portion of a graphical user interface (GUI) of a first application executing on a first computing device, wherein the GUI is outputted on a first display device and wherein the specified first portion is less than the entire GUI, rendering the GUI of the first application on a first virtual display of the first computing device, removing, based on the rendering, the GUI of the first application from the first display device, and generating a first widget which displays the first portion of the GUI of the first application on the first display device, wherein the first widget includes one or more interactive elements that expose an underlying functionality of the first portion of the GUI.

According to another embodiment, a computer program product comprises a computer-readable storage medium having computer-readable program code embodied therewith, the computer-readable program code executable by one or more computer processors to perform an operation comprising receiving input specifying a first portion of a graphical user interface (GUI) of a first application executing on a first computing device, wherein the GUI is outputted on a first display device and wherein the specified first portion is less than the entire GUI, rendering the GUI of the first application on a first virtual display of the first computing device, removing, based on the rendering, the GUI of the first application from the first display device, and generating a first widget which displays the first portion of the GUI of the first application on the first display device, wherein the first widget includes one or more interactive elements that expose an underlying functionality of the first portion of the GUI.

BRIEF DESCRIPTION OF THE SEVERAL VIEWS OF THE DRAWINGS

FIGS. 3A-3B illustrate example widgets, according to various embodiments.

DETAILED DESCRIPTION

Embodiments disclosed herein allow users to create custom widgets that mirror any portion of the graphical user interface (GUI) of applications. For any application, the user may provide input specifying to create a widget based on at least a portion of the GUI of the application, such as the first five lines of a user's inbox in an email client. Embodiments disclosed herein may then create a virtual display (or desktop) for the application and the widget, where the virtual display hosts the application in full screen mode, allowing any part of the GUI to be mirrored as a widget. When a user provides input (such as a keystroke or mouse click) to the widget, the widget may pass the input to the virtual display hosting the application. The virtual display hosting the application may then execute the command. When appropriate, the results of executing the command may then be passed to the widget for display.

Furthermore, once the user has created widgets, the user may arrange the widgets on their main display according to their preference. Similarly, the user may specify an arrangement of the widgets to display on a mobile device (or other remote device having a display device). The mobile device may then display the arrangement of widgets as defined by the user.

Figure 1:
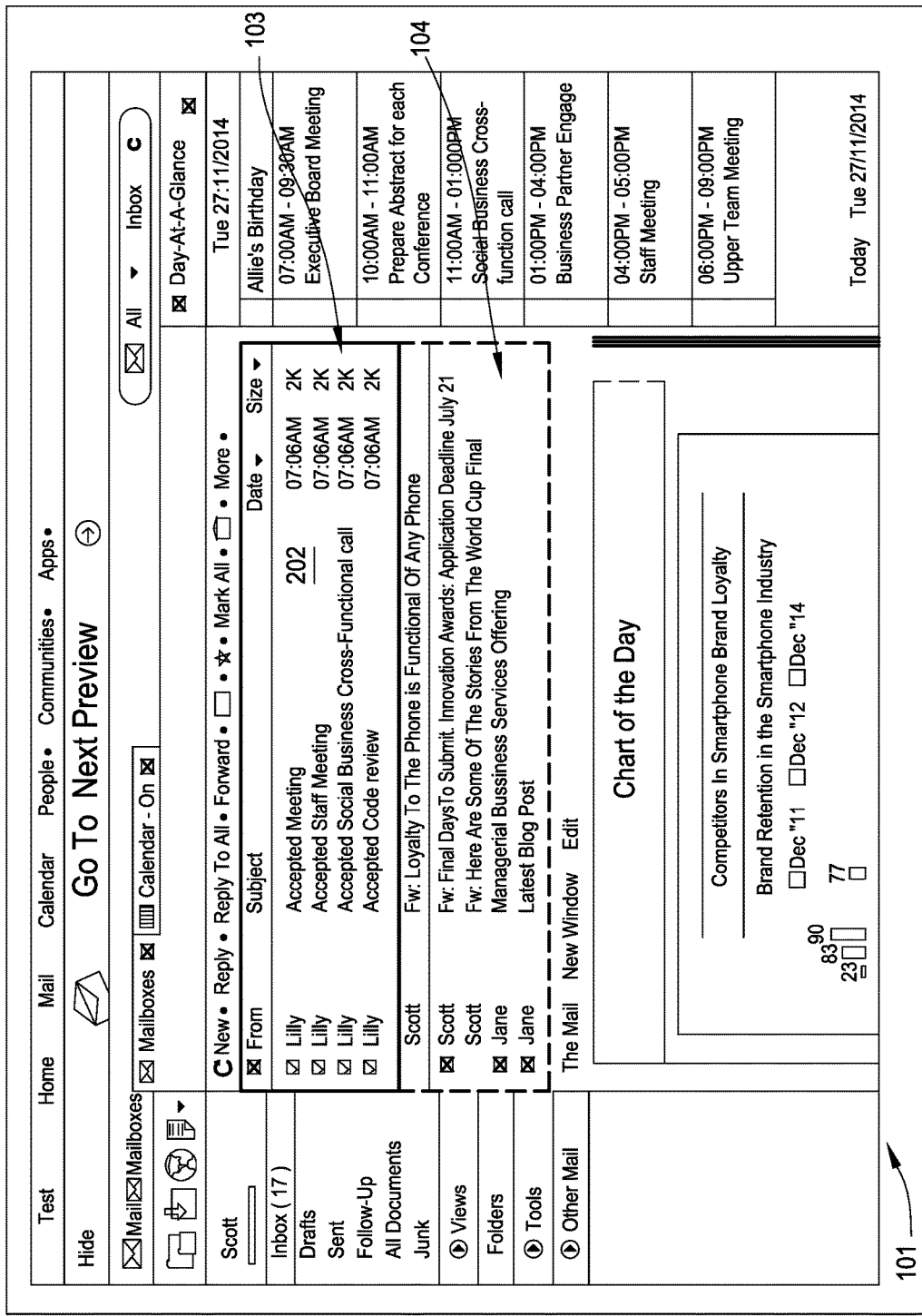
FIG. 1 illustrates an example graphical user interface used to create a custom widget, according to one embodiment.

FIG. 1 illustrates a display device 100 outputting an example GUI 101 used to create a custom widget, according to one embodiment. As shown, the GUI 101 is the GUI of an email application, which includes, among other elements, an email inbox 102. Embodiments disclosed herein allow a user to create one or more widgets for the GUI 101 of the email application. In some embodiments, the user may create the widgets using a widget application (not pictured). To do so, the user may first define an area of the GUI of the application to serve as the viewable portion of the widget. As shown, the user has defined a box 103 with a mouse (not pictured) that covers the most recent emails in the inbox 102 of the email application. The box 103 therefore serves as the main area that will be displayed by the generated widget on the display 100, allowing the user to monitor the inbox 102 as new emails arrive, without occupying the entirety of the display 100 with the undesired remainder of the GUI 101 of the email application. Doing so allows the user to occupy the display 100 with other desirable items, such as additional widgets and/or application GUIs.

Furthermore, a user may specify additional areas that can be a "scrollable" part of a widget that is generated and outputted on the display 100. As shown, the user has defined a box 104 that includes an additional portion of the inbox 102 of the GUI 101. The box 104 covers the remainder of the visible portion of the email inbox 102 of the GUI 101 that is included in box 103. While box 103 defines the default area of the inbox 102 displayed by the generated widget, the box 104 includes an additional area of the inbox 102 that can be displayed in the widget on the display 100 when the user activates a scrollbar displayed in the widget. Therefore, while the box 103 is not large enough to cover the entire inbox 102, the scrollable portion provided by box 104 allows a user to scroll through the inbox 102 in a widget that is more compact in size than the size of the GUI 101.

The boxes 103, 104 determine coordinates of the GUI 101 that are associated with the resulting widget. Doing so maps user inputs (e.g., mouse clicks, touchscreen presses, etc.) to the appropriate portion of the GUI 101 of the application, properly tracks inputs provided via the widgets to the GUI 101 of the application, and the desired application functionality can be achieved via the generated widgets.

Figure 2:
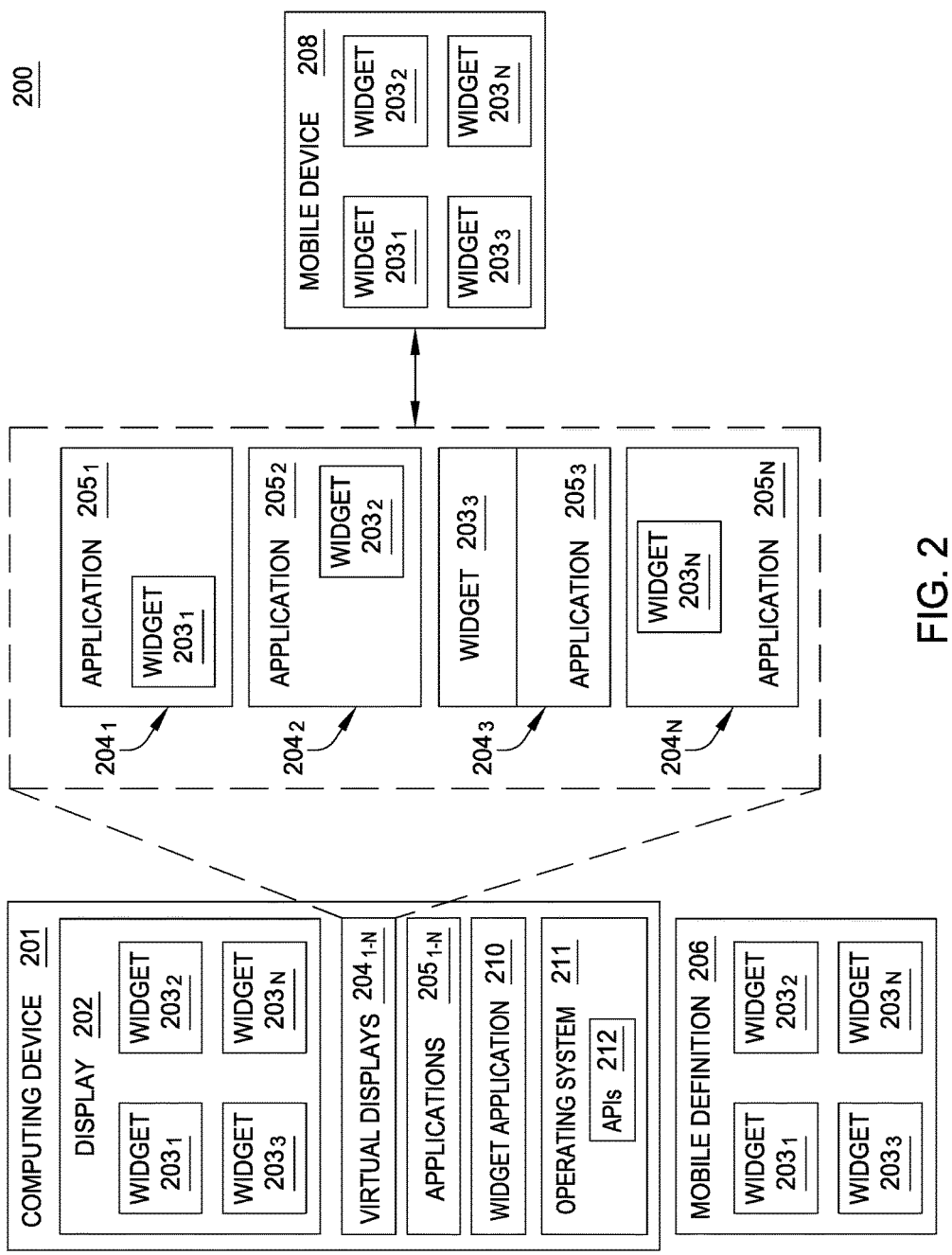
FIG. 2 illustrates a system which allows users to define custom widgets based on the graphical user interfaces of applications, according to one embodiment.

FIG. 2 illustrates a system 200 which allows users to define custom widgets based on the graphical user interfaces of applications, according to one embodiment. As shown, the system 200 includes a computing device 201. The computing device 201 is representative of any type of computing device, such as a desktop computer, laptop computer, tablet, mobile device, portable gaming device, and the like. The computing device 201 generally includes a processor, memory, and other components that are not pictured for the sake of clarity. As shown, the computing device 201 includes a display device 202, one or more virtual displays $204_{1-N}$, one or more applications $205_{1-N}$, a widget application 210, and an operating system 211. The display device 202 is representative of any type of display device, which may be integrated into the computing device 201, or may be an external component communicably coupled to the computing device 201. The operating system 211 manages hardware and software resources of the computing device 201 and provides common services for computer programs via a plurality of application programming interfaces (APIs) 212.

As shown, the display device 202 illustratively outputs four example widgets $203_{1-N}$ executed by the computing device 201. Each widget $203_{1-N}$ mirrors at least a portion of the graphical user interface (GUI) of one of the applications $205_{1-N}$ while maintaining the functionality of the respective portion of the GUI. For example, the widget $203_1$, when outputted on the display 202, may mirror box 103 (and box 104 when scrolled) of the GUI 101 of the email application depicted in FIG. 1. As another example, application $205_2$ may be a word processing application, and widget $203_2$ may display a toolbar of a GUI of the word processing application on display 202. In such an example, a user may select toolbar buttons from the widget $203_1$ depicted on the display device 102 (or the mobile device 208) to, for example, open a file, save a file, create a blank document, and the like. Generally, a user of the device 201 may arrange the widgets $203_{1-N}$ in any orientation by moving each widget $203_{1-N}$ on the display 202. Therefore, the arrangement depicted on the display device 202 (and/or the mobile device 208) in FIG. 2 is for illustrative purposes only. Furthermore, the user may adjust the size of the widgets $203_{1-N}$ on the display 202 (and/or the mobile device 208) as needed. Therefore, each widget $203_{1-N}$ includes properties that facilitate zooming and/or scaling of the widget $203_{1-N}$, such that all of the content of the corresponding application area is displayed in the widget $203_{1-N}$ when resized on the display 202 (and/or the mobile device 208).

The widgets $203_{1-N}$ depicted on the display 102 and mobile device 208 are custom widgets in that a user may generate the widgets using the widget application 210 via the techniques described with reference to FIG. 1. As such, the widgets $203_{1-N}$ are not provided as part of the applications $204_{1-N}$ "out of the box" (e.g., provided by a developer of the applications $204_{1-N}$). To create a widget $203_{1-N}$, a user may use the widget application 210 to define an area of the GUI of one of the applications $205_{1-N}$ to serve as the viewable portion of the widget $203_{1-N}$, as depicted in FIG. 1. Generally, the user may define, on the display 202, an area of the GUI of one of the applications $205_{1-N}$ using a mouse or touchscreen. The widget application 210 may then map the mouse (or touchscreen) coordinates which define the area to a set of points defining the viewable area for the resulting widget $203_{1-N}$. In response, the widget application 210 may use an API 212 to generate a new instance of a virtual display $204_N$, and generate a unique widget identifier that associates the new instance of the virtual display $204_N$ with the selected application $205_N$. Once the virtual display $204_N$ is created for the new widget, the widget application 210 may move the associated application $205_N$ from the main display 202 to the new virtual display $204_N$, where the application $205_N$ executes in full screen mode (e.g., the GUI 101 of the email application is displayed in full screen on a virtual display $204_N$). The widget application 210 may then associate the coordinates of the user-defined GUI area with a corresponding portion of the full screen application $205_N$ rendered on the corresponding virtual display $204_N$. The widget application 210 may move the virtual displays $204_{1-N}$ "off screen," in that they are not outputted for display via the display 202 (e.g., are not visible on the display 202). However, in some embodiments, a user may view the virtual displays $204_{1-N}$ on the display 202 if desired. The widget application 210 may then use one of the APIs 212 of the operating system 211 to create a window for the widget $203_{1-N}$ on the display 202, which displays content received from the corresponding virtual display $204_{1-N}$.

The virtual displays $204_{1-N}$ for the widgets $203_{1-N}$ are illustratively depicted in box 207 of FIG. 2. As shown, each virtual display $204_{1-N}$ executes a corresponding application $205_{1-N}$. However, in some embodiments, a user may define more than one widget for a single application. In such embodiments, each widget may be associated with its own virtual display which executes an instance of the associated application. As shown, each widget $203_{1-N}$ of the virtual displays $204_{1-N}$ is illustratively overlaid on a different portion of the full screen GUI of the corresponding application $205_{1-N}$, reflecting the portion of the GUI that the user has defined for the widget $203_{1-N}$ on the display 202. Therefore, as shown, widget $203_1$ occupies the bottom left corner of the GUI of application $205_1$, widget $203_2$ occupies the bottom right corner of the GUI of application $205_2$, and widget $203_3$ occupies the top portion of the GUI of application $205_3$.

The virtual displays $204_{1-N}$ facilitate interactions between the user and the applications $205_{1-N}$ via the corresponding widgets 203 on the display 202 (and/or mobile device 208). The virtual displays $204_{1-N}$ allow users to provide input via the widgets $203_{1-N}$ (on the display 202 and/or mobile device 208), and translate the input to the appropriate portion of the GUI of the corresponding application $205_{1-N}$. For example, if a user clicks on a play button of a widget $203_N$ on the display 202 specifying to play a song, the widget $203_N$ on the display 202 may transmit an indication of the play button click to the widget application 210 (or the virtual display $204_N$). The indication may include a type of action (e.g., a mouse click), the selectable element of the widget that was interacted with (e.g., the play button), and the unique identifier of the widget $203_N$. The widget application 210 may then route the indication to the corresponding virtual display $204_N$ (based on the mapping between the unique identifier of the widget and one of the virtual displays $204_{1-N}$). The virtual display $204_N$ may map the coordinate of the input provided to the widget $203_N$ (e.g., the mouse click on the display 202) to a portion of the application $205_N$ (e.g., the play button), and provide the input to the GUI of the application $205_N$ at the mapped location (e.g., the click on the play button). The application $205_N$ may then perform the requested operation (e.g., begin playing the requested song). If performance of the requested operation generates output (e.g., displaying a title of the song being played), the virtual display $204_N$ may transmit the output to the respective widget $203_N$ depicted on the display 202.

To capture and transmit the relevant portion of the GUIs of the applications $205_{1-N}$, in at least one embodiment, a remote framebuffer (RFB®) solution is used. The RFB is a protocol providing remote (or external) access to application GUIs via the framebuffer of the system. A framebuffer is a portion of system memory which contains a bitmap that is driven to a video display (e.g., the display 202) for output. The RFB protocol facilitates the transfer of the bitmap to an application executing on a local or remote device, where the contents of the bitmap can be displayed. The Virtual Network Computing® (VNC®) system uses the RFB protocol to remotely control another compute by transmitting keyboard, mouse, and other input events from one computer to another, relaying the graphical screen updates in the other direction over a network. (VNC and RFB are registered trademarks of RealVNC Ltd.).

Embodiments disclosed herein may leverage the RFB protocol and/or VNC system to allow the widgets $203_{1-N}$ to display the corresponding portion of the application GUI on the display 202 (and/or mobile device 208) and provide input to the applications $205_{1-N}$, regardless of whether the widgets $203_{1-N}$ are executing on a local device (e.g., the device 201) or a remote computing device (e.g., the mobile device 208). Generally, an operating system 211 implementing RFB and/or VNC provides APIs 212 to allow the virtual display $204_N$ to "grab" the relevant portion of the application GUI on the display 202 (e.g., the area of the GUI defined by the user in creating a widget $203_{1-N}$). Doing so allows the virtual displays $204_{1-N}$ to reproduce only the user-defined portions of the GUI (e.g., the boxes 103, 104 of FIG. 1), and periodically refresh the GUI of the widget $203_{1-N}$ on the display 202 by sending these portions of the GUI to the corresponding widget $203_{1-N}$.

The widgets $203_{1-N}$ may be enriched with rules dictating predefined operations when certain inputs are provided by the user. The rules may specify a type of user input and an associated response. For example, if a widget displays a search box associated with a web browser, a first rule may specify what occurs when the user types a search string into the search box, and clicks a search button depicted on the widget (or presses enter on their keyboard). The input type associated with the first rule may be the clicking of the search button and/or pressing enter on the keyboard. The response of the first rule may specify to submit the search string to the associated web browser, which then submits the search string to the search engine. The first rule may then specify to open the web browser on the main display 202, allowing the user to view the search results in full on the display 202.

As shown, FIG. 2 includes a mobile definition 206. The mobile definition 206 is a user-specified arrangement of widgets $203_{1-N}$ that can be displayed on a mobile device 208. The user may use the widget application 210 to define the mobile definition. The widget application 210 may then provide an open port which allows the mobile device 208 to display the widgets $203_{1-N}$ in a single window. Therefore, as shown, the mobile device 208 displays the widgets $203_{1-N}$ according to the arrangement defined by the mobile definition 206. A user of the mobile device 208 may then use the widgets $203_{1-N}$ to remotely access, use, and monitor the corresponding applications $205_{1-N}$ as the user would interact with a widget $203_{1-N}$ on the display 202.

FIG. 3A illustrates an example widget 300, according one embodiment. As shown, the widget 300 displays a portion of the email inbox 102 of FIG. 1. As shown, the widget 300 exposes many of the functions of the GUI 101 of the email application of FIG. 1. For example, as shown, a user has highlighted an email 301 of the inbox 102 displayed in the widget $103_N$. When the user right clicks the email 301, the widget 300 may transmit the right click to the virtual display 204 hosting the associated full screen email application. In response to the right click, the email application may bring a contextual menu to provide the user with different options, such as to reply to the email, forward the email, delete the email, and the like. As previously indicated, the virtual display 204 and/or the widget application 210 may transmit the relevant portion of the GUI 101 of the email application that is associated with the coordinates of the widget 300. However, the contextual menu may not be visible, as the contextual menu may fall outside of the coordinates of the widget 300. Advantageously, however, the widget 300 may dynamically extend itself to facilitate display of the contextual menu.

FIG. 3B depicts the widget 300 after it has been dynamically extended responsive to the user right clicking the email 301 in the widget 300. As shown, the widget now displays the contextual menu 302. A portion 303 of the contextual menu 302 is within the original area of the widget 300, while a portion 304 of the contextual menu 302 is outside of the original area of the widget 300. Therefore, the widget 300 has been dynamically extended to include the portion 304 of the contextual menu 302 that would otherwise not be depicted if the widget 300 was not dynamically extended. In at least one embodiment, the widget 300 is extended based on a size of the portion 304 of the contextual menu 302 (or the size of the contextual menu 302 itself), such that the entire contextual menu 302 is viewable in the widget 300.

In addition, the user may define one or more rules associated with the contextual menu 302. For example, if the user clicks on a "reply" portion of the contextual menu 302 (the input action of the rule), the corresponding action may be to open the email application on the main display 202, allowing the user to compose their reply to the email 301 in the GUI 101 of the full email application (rather than the widget 300). Generally, any number and type of rules may be defined for each widget.

Figure 4:
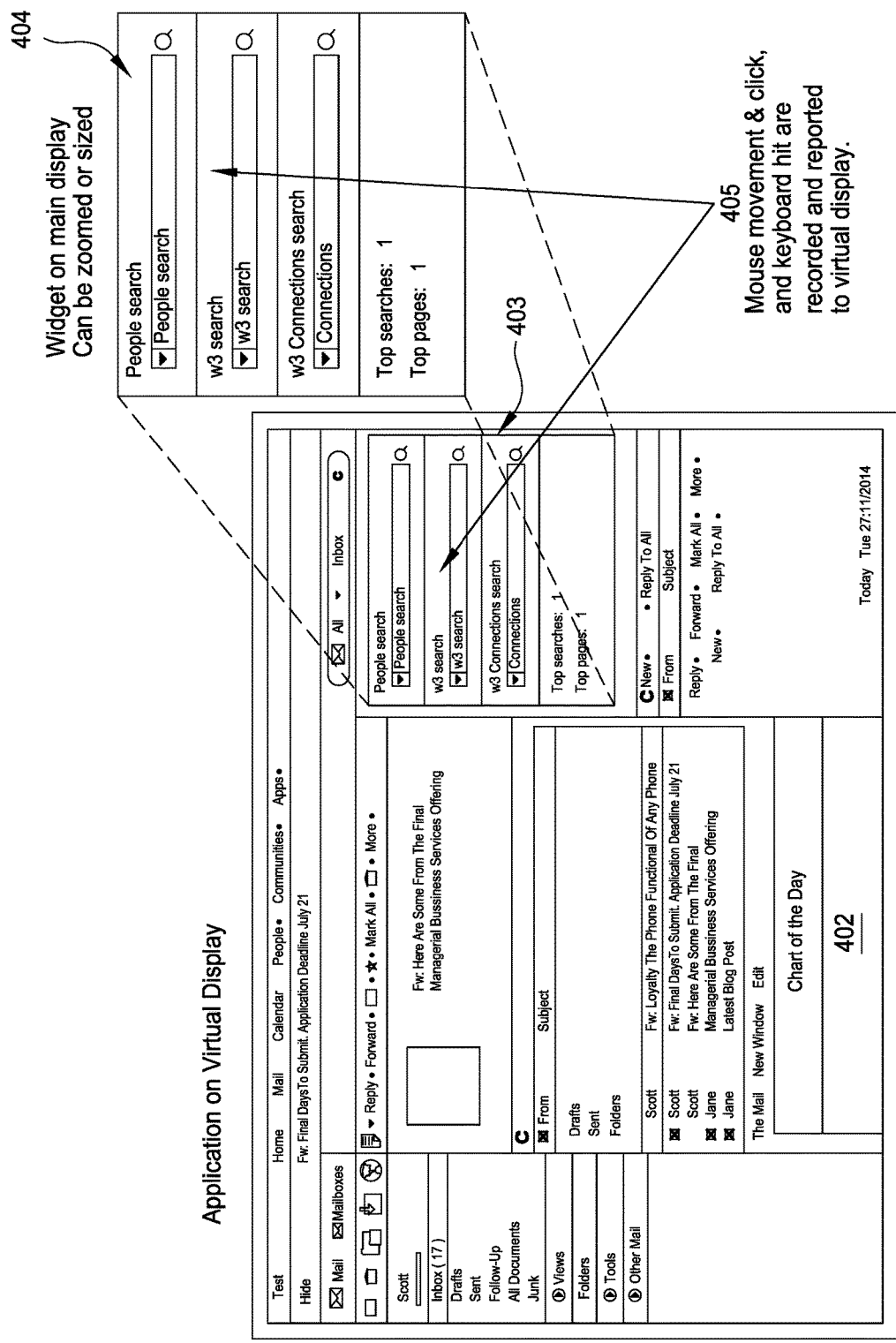
FIG. 4 illustrates an example widget that interacts with a virtual display, according to various embodiments.

FIG. 4 illustrates an example widget 404, according one embodiment. As shown, a virtual display 401 executes an application having a GUI 402. The user has defined the widget 404 to correspond to portion 403 of the GUI 402. As previously indicated, the widget 404 can be zoomed and/or resized by the user. The zoom factor for zooming may be a property of a given widget, e.g., 150% to zoom in on the widget by 150%. Similarly, a scaling factor may be a property of a given widget, reflecting the adjusted size of a widget, e.g., 0.75 when a user decreases the size of the widget by 25%, or 1.25 when the user increases the size of the widget by 25%.

Furthermore, when the user interacts with the widget 404 on the main display (e.g., the display 202 and/or the display of the mobile device 208), the widget 404 records all user interactions, and reports these interactions to the virtual display 401. For example, if the user moves their mouse to a position 405 on the widget 404, the virtual display receives the current position of the mouse, and moves the mouse to position 405 on the virtual display 401. Generally, whatever input provided by the user to the widget 404 is transmitted to the virtual display 401 to execute the associated function in the application GUI 402.

Figure 5:
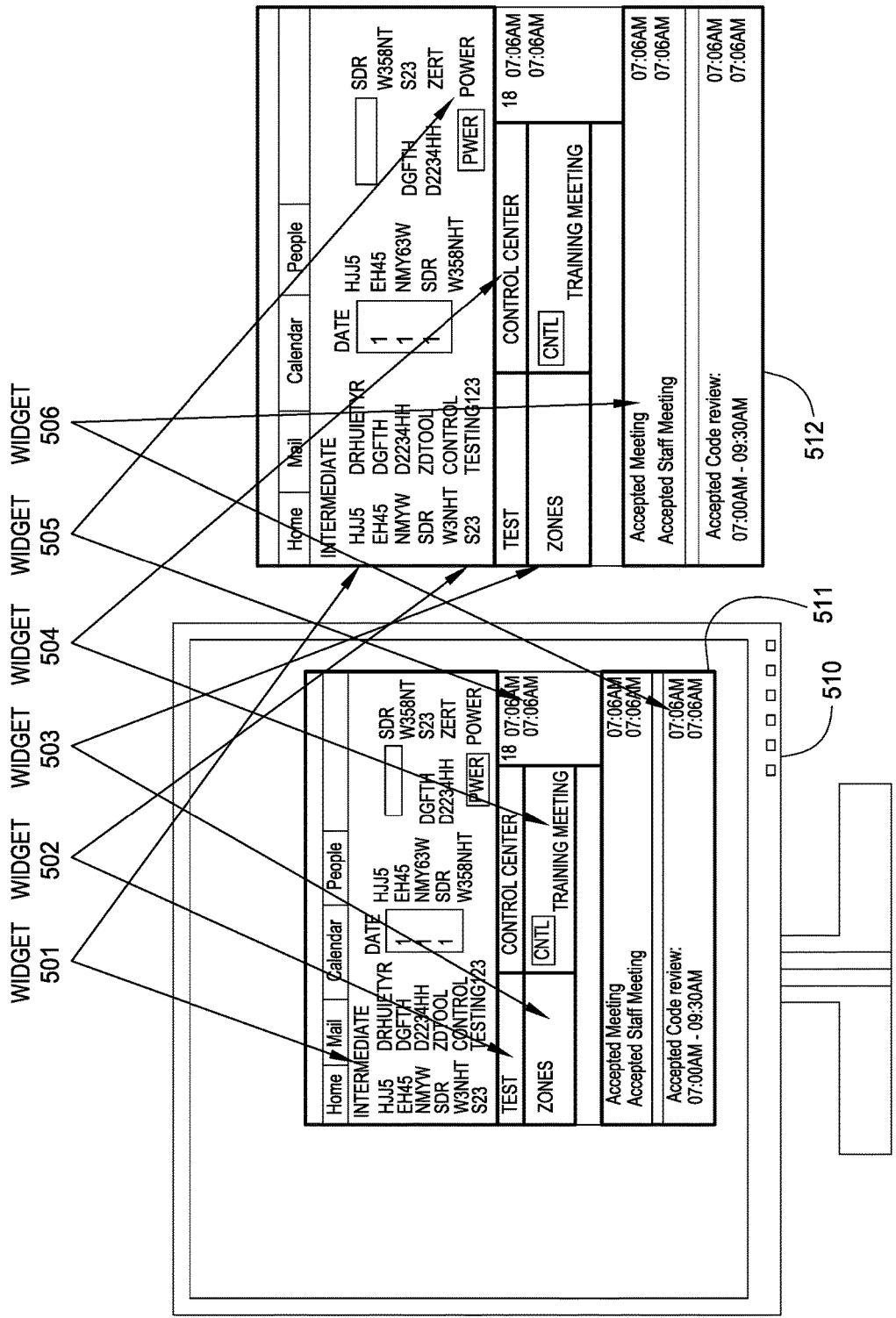
FIG. 5 illustrates an example custom layout of widgets for display on a mobile device, according to one embodiment.

FIG. 5 illustrates an example custom layout of widgets for display on a mobile device, according to one embodiment. As shown, FIG. 5 includes a display device 510 and a mobile device 512. The display device 510 outputs a GUI 511, which in one embodiment is a GUI of the widget application 210. The GUI 511 of the widget application 210 allows the user to define a mobile orientation of a plurality of widgets and/or applications. As shown, the user has arranged six different widgets 501-506 in a specific manner in the GUI 511. The mobile device 512 executes an application that can communicate with the widget application 210 (such as a web browser, or an instance of the widget application 210), and output the arrangement of widgets 501-506 on the mobile device 512 as they appear on the GUI 511. Therefore, as shown, the mobile device 512 outputs the widgets 501-506 as they appear on the GUI 511, and the user may interact with the widgets 501-506 to control the applications corresponding to the widgets 501-506 that are executing on a computing device associated with the display device 510 as described herein.

In one embodiment, one or more of the widgets 501-506 may be replaced with the virtual display rendering the GUI of the application associated with the respective widget 501-506. In such embodiments, the GUI 511 depicts an arrangement of virtual displays with full screen applications. Therefore, in such embodiments, the mobile device 512 may display the full screen GUIs of the applications depicted on the virtual displays. For example, the mobile device 512 may output the virtual display rendering the GUI of the application associated with the widget 501 rather than the widget 501 itself. Generally, any combination of widgets and virtual displays may be arranged on the GUI 511, and outputted on the mobile device 512.

Figure 6:
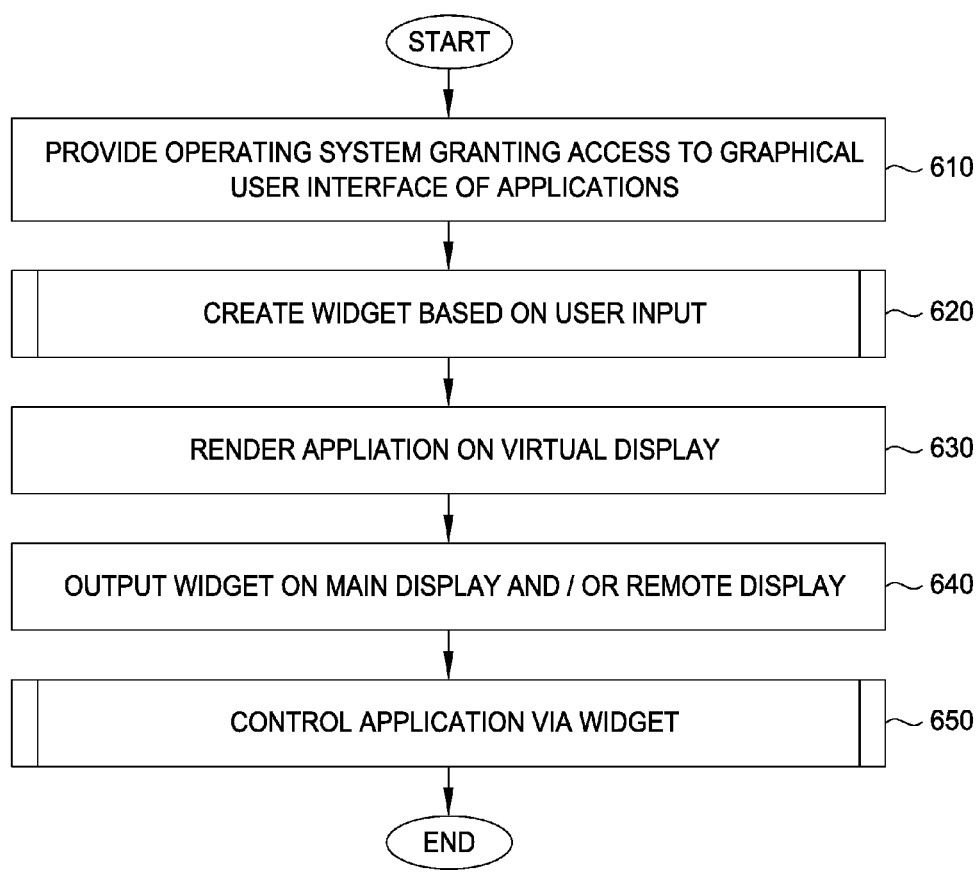
FIG. 6 is a flow chart illustrating a method to define custom widgets based on the graphical user interfaces of applications, according to one embodiment.

FIG. 6 is a flow chart illustrating a method 600 to define custom widgets based on the graphical user interfaces of applications, according to one embodiment. As shown, the method 600 begins at block 610, where an operating system 211 which provides access to the GUI of applications via the APIs 212 is provided on a computing device. Generally, such operating systems may provide the APIs 212 which allow applications to capture at least a portion of the GUI of an application, and transmit the captured portion of the GUI to a widget, mobile device, remote device, and the like. Examples of such functionality include the RFB protocol and the VNC system. Doing so allows the content displayed by the widget to mirror the application content, and allows the widget to be periodically refreshed such that the displayed content is current. Further still, the APIs 212 of the operating system 211 may allow a widget to determine whether it is covered by other on-screen objects. Similarly, the operating system 211 further provides APIs 212 to launch applications that are rendered off-screen (e.g., on a virtual display), and APIs 212 to create windows for the widgets defined by users.

At block 620, described in greater detail with reference to FIG. 7, the widget application 210 may create a widget based on user input. Generally, to create a widget, the user defines the area of an application GUI that is mirrored by the widget. The widget application 210 may then use the defined area to map the visible portion of the widget to the full screen instance of the application rendered on the virtual display. At block 630, the widget application 210 may launch a virtual display for the application, and render the application in full screen on the virtual display. At block 640, the widget application 210 may generate the widget using an API call to create a window for the widget, and output the widget on the main display screen and/or a remote display via a network. The virtual display may periodically send updates of the relevant portions of the GUI of the application to the widget to refresh the widget. At block 650, the user may control the application using the widget. Generally, the widget has properties that allow it to detect input by the user, such as mouse clicks, keyboard input, resizing of the widget, zooming of the widget, and the like. These inputs may then be reported to the corresponding virtual display, which maps the input to the proper portion of the GUI of the full screen application. The application and/or the GUI may then process the input accordingly. If rules are defined for the widget, and an input event corresponding to a rule is detected, the corresponding action may be performed, such as opening an email editor to allow a user to reply to an email.

Figure 7:
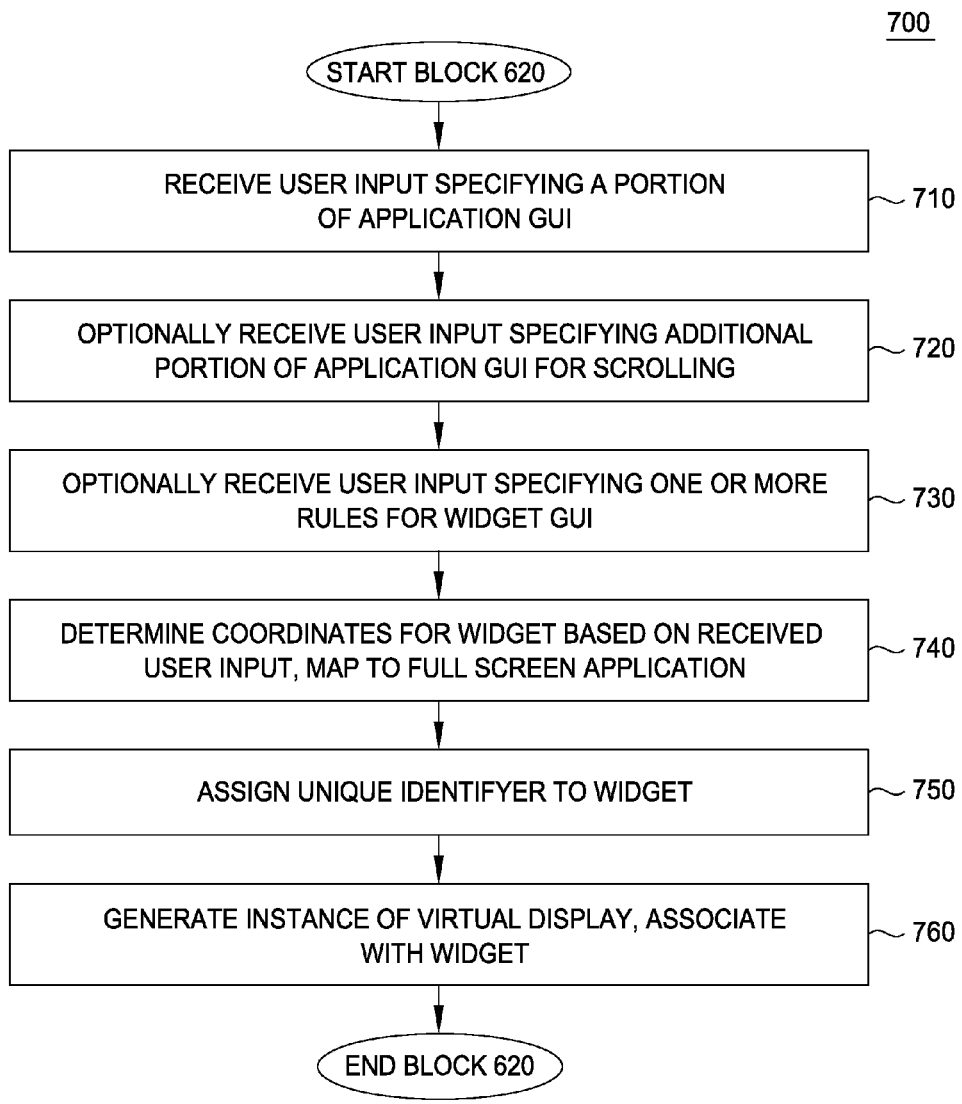
FIG. 7 is a flow chart illustrating a method to create a widget based on user input, according to one embodiment.

FIG. 7 is a flow chart illustrating a method 700 corresponding to block 620 to create a widget based on user input, according to one embodiment. As shown, the method begins at block 710, where the widget application 210 receives user input specifying a portion of an application GUI, such as the box 102 of FIG. 1. In at least one embodiment, the user may provide the input via a mouse cursor. At block 720, the widget application 210 may optionally receive user input specifying an additional portion of the application's GUI for scrolling, such as the box 104 of FIG. 1. At block 730, the widget application 210 may optionally receive user input specifying rules for the widget GUI. For example, a first rule may specify to open the associated application in full screen on the main display (and hide the widget) when the user submits a search string. At block 740, the widget application 210 may determine the coordinates of the input received at blocks 710-730, and map the coordinates to the full screen application GUI rendered on the associated virtual display. Doing so allows input received on the widget to be properly mapped to the GUI, and further allows the widget to properly display the desired portion of the application GUI selected by the user. At block 750, the widget application 210 may assign a unique identifier to the widget. At block 760, the widget application 210 may use an API 212 of the operating system 211 to generate an instance of a virtual display. The virtual display may have a unique identifier. The widget application 210 may associate the unique identifier of the virtual display, the unique identifier of the widget, and the application serving the basis of the widget.

Figure 8:
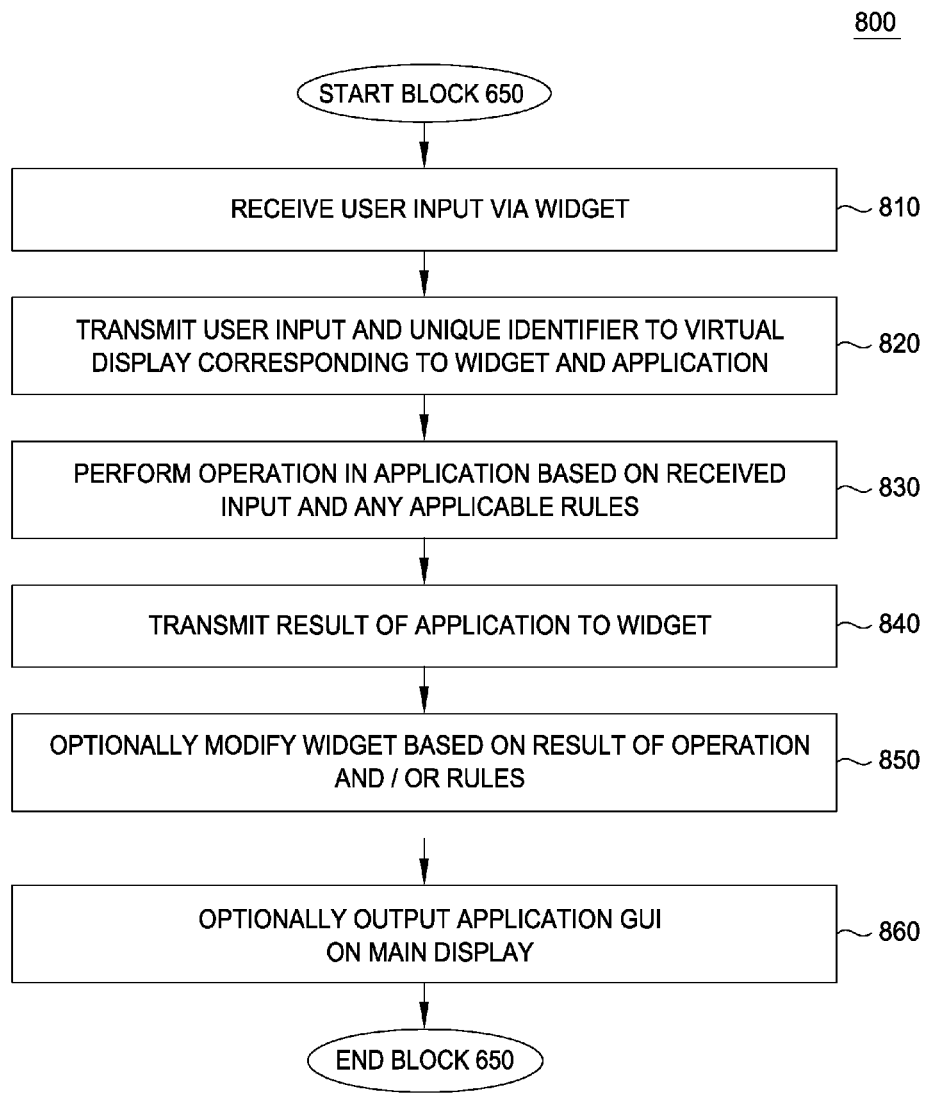
FIG. 8 is a flow chart illustrating a method to control an application via a widget, according to one embodiment.

FIG. 8 is a flow chart illustrating a method 800 corresponding to block 650 to control an application via a widget, according to one embodiment. As shown, the method 800 begins at block 810, where the widget receives user input, such as keypresses, clicks, and the like. At block 820, the widget may transmit the user input and the unique identifier of the widget to the widget application 210. In some embodiments, however, the widget may transmit the user input and the unique identifier directly to the virtual display and/or associated application. At block 830, the application performs an operation based on the received user input and any applicable rules. For example, if a user clicks a refresh button on a widget corresponding to a web browser which displays the weather, the web browser may refresh the web page to retrieve the most current weather conditions. At block 840, the widget application 210 and/or the virtual display may transmit a result of the operation to the widget. For example, the virtual display may transmit an updated GUI of the web browser which depicts the refreshed, updated weather conditions. At block 850, the widget may optionally be modified based on a result of the operation and/or one or more rules. For example, if a portion of the output would not be visible in the widget, the widget may dynamically extend itself to display the output. At block 860, the widget application 210 may optionally output the application GUI on the main display screen. For example, if the user specifies to compose an email via a widget, the corresponding email application may be brought to the main display, and an email template rendered for the user to compose the email.

Figure 9:
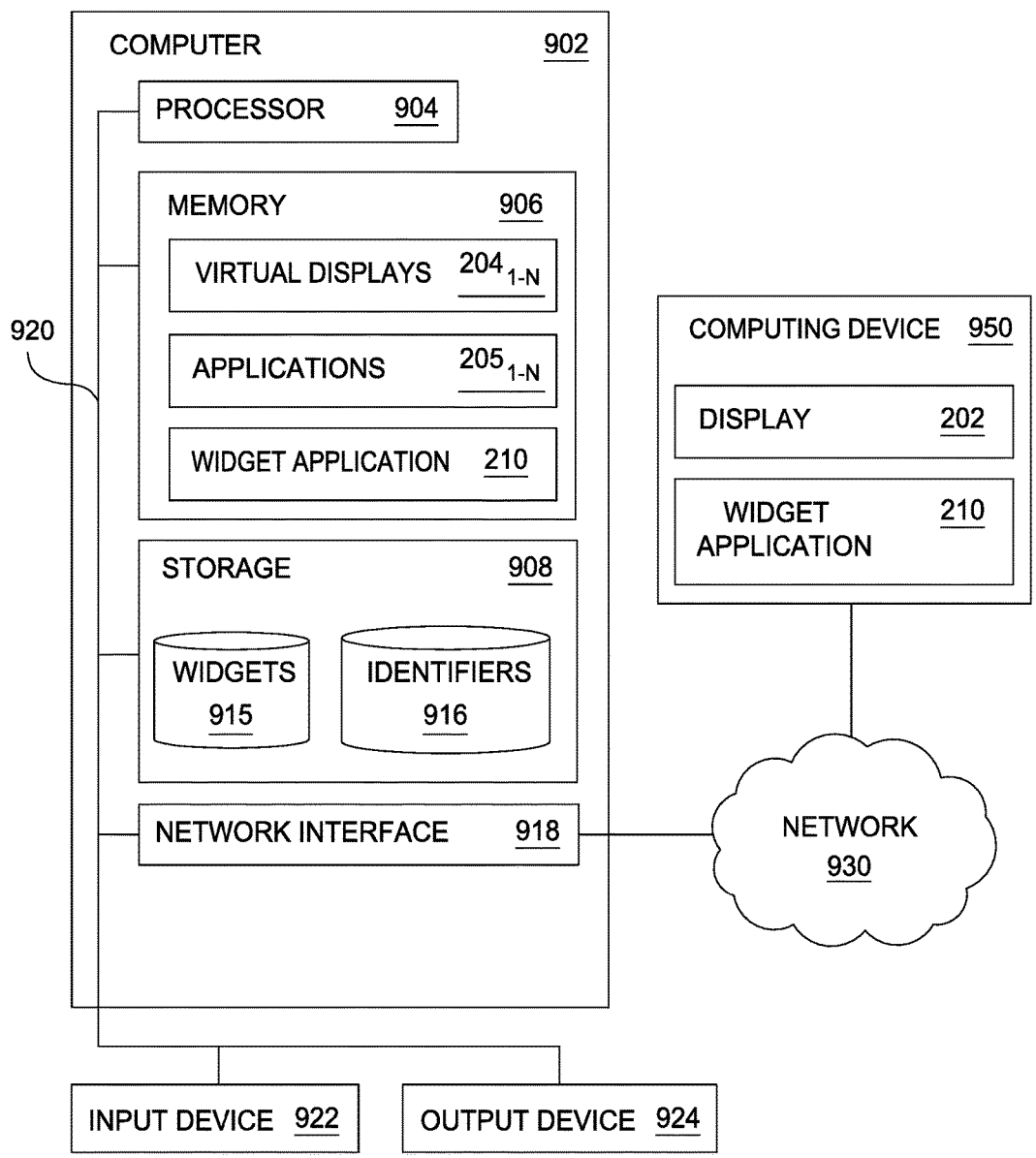
FIG. 9 is a block diagram illustrating a system which allows users to define custom widgets based on the graphical user interfaces of applications, according to one embodiment.

FIG. 9 is a block diagram illustrating a system 900 which allows users to define custom widgets based on the graphical user interfaces of applications, according to one embodiment. The networked system 900 includes a computer 902. The computer 902 may also be connected to other computers via a network 930. In general, the network 930 may be a telecommunications network and/or a wide area network (WAN). In a particular embodiment, the network 930 is the Internet.

The computer 902 generally includes a processor 904 which obtains instructions and data via a bus 920 from a memory 906 and/or a storage 908. The computer 902 may also include one or more network interface devices 918, input devices 922, and output devices 924 connected to the bus 920. The computer 902 is generally under the control of the operating system 211 (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 904 is a programmable logic device that performs instruction, logic, and mathematical processing, and may be representative of one or more CPUs. The network interface device 918 may be any type of network communications device allowing the computer 902 to communicate with other computers via the network 930.

The storage 908 is representative of hard-disk drives, solid state drives, flash memory devices, optical media and the like. Generally, the storage 908 stores application programs and data for use by the computer 902. In addition, the memory 906 and the storage 908 may be considered to include memory physically located elsewhere; for example, on another computer coupled to the computer 902 via the bus 920.

The input device 922 may be any device for providing input to the computer 902. For example, a keyboard and/or a mouse may be used. The input device 922 represents a wide variety of input devices, including keyboards, mice, controllers, and so on. Furthermore, the input device 922 may include a set of buttons, switches or other physical device mechanisms for controlling the computer 902. The output device 924 may include output devices such as monitors, touch screen displays, and so on.

As shown, the memory 906 contains virtual displays $104_{1-N}$, applications $105_{1-N}$, and the widget application 210. Generally, the computer 902 is configured to implement all apparatuses, methods, and functionality described above with reference to FIGS. 1-8.

As shown, the storage 908 contains the widgets 915, which stores user-defined widgets that are generated according to embodiments disclosed herein. Each widget 915 may include an executable application portion which displays the desired portion of an underlying application $105_{1-N}$ on a display device. The widgets in the widgets 915 may also have associated metadata, such as a unique identifier, rules (including associated input triggers and responses), coordinates, positioning on a display, extendable regions, refresh rates, and the like. The storage 908 also includes a data store of identifiers 916. The identifiers 916 include unique identifiers for each virtual display $204_{1-N}$, and the unique identifier of each widget in the widgets 915. The identifiers 916 may also include associations mapping the identifier of each virtual display $204_{1-N}$ to the identifier of a corresponding widget in the widgets 915.

As shown, a computing device 950 executing an instance of the widget application 910 is communicably coupled to the computer 902 via the network 950. The computing device 950 is representative of any type of computing device, such as a desktop computer, a smartphone, mobile device, and the like. The mobile device 950 illustratively includes a display 102 which may be used to display widgets 915 generated by a user using the widget application 210.

Advantageously, embodiments disclosed herein allow users to define custom widgets for any portion of a GUI of any type of application. Users may specify a portion of the application GUI which the widget mirrors. Doing so allows users to customize their desktop with any number of widgets that occupy less screen space than the corresponding applications themselves.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the widget application 210 could execute on a computing system in the cloud and allow users to create custom widgets. In such a case, the widget application 210 could store the generated widgets at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving input specifying a first portion of a graphical user interface (GUI) of a first application executing on a first computing device, wherein the GUI is outputted on a first display device and wherein the specified first portion excludes at least one component of the GUI;
rendering the GUI of the first application on a first virtual display of the first computing device;
removing, based on the rendering, the GUI of the first application from the first display device;
generating a first widget which displays the first portion of the GUI of the first application on the first display device;
associating a unique identifier of the first widget with a unique identifier of the first virtual display;
upon receiving user input on the first widget displayed on the first display device;
determining coordinates on the first widget where the user input was received;
transmitting, to the first virtual display, an indication of: (i) the coordinates on the first widget where the user input was received, (ii) a type of the user input, and (iii) the unique identifier of the first widget, wherein the first virtual display is identified based on the association between the unique identifier of the first virtual display and the unique identifier of the first widget;
mapping the coordinates on the first widget to corresponding coordinates on the GUI rendered on the first virtual display; and
generating an input at the corresponding coordinates on the GUI rendered on the first virtual display, based on the user input;
generating, by the first application, an output responsive to the received user input;
transmitting, by the first virtual display to the first widget, the output; and
determining that a portion of the output is not visible on the first display device due to a size of the first widget;
increasing the size of the first widget to display, on the first display device, the output including the portion of the output that was not visible; and
refreshing the first widget to display the output on the first display device.

2. The method of claim 1, further comprising:
receiving user input specifying a second portion of the GUI, different than the first portion of the GUI; and
providing a scrollbar on the first widget which allows a user to scroll between the first portion of the GUI and the second portion of the GUI, wherein the first widget is of a size that is smaller than a collective size of the first portion of the GUI and the second portion of the GUI.

3. The method of claim 1, further comprising:
determining that the received user input is associated with a first rule, of a plurality of rules for the first widget;
determining that the first rule is associated with a first response, wherein the first response specifies to:
minimize the first widget such that the first widget is not displayed on the first display device; and
display the GUI of the first application on the first display device.

4. The method of claim 1, further comprising:
receiving input specifying a first portion of a GUI of a second application, wherein the GUI of the second application is outputted on the first display device;
rendering the GUI of the second application on a second virtual display, and not on the first display device;
generating a second widget which displays the first portion of the GUI of the second application on the first display device, wherein a unique identifier of the second widget is associated with a unique identifier of the second virtual display; and
outputting the first and second widgets on a second display device, wherein the second display device is of a second computing device, communicably coupled to the first computing device.

5. A system, comprising:
one or more computer processors;
a memory containing a program which when executed by the processors performs an operation comprising:
receiving input specifying a first portion of a graphical user interface (GUI) of a first application executing on a first computing device, wherein the GUI is outputted on a first display device of the system and wherein the specified first portion excludes at least one component of the GUI;
rendering the GUI of the first application on a first virtual display of the first computing device;
removing, based on the rendering, the GUI of the first application from the first display device;
generating a first widget displays the first portion of the GUI of the first application on the first display device;
associating a unique identifier of the first widget with a unique identifier of the first virtual display;
upon receiving user input on the first widget displayed on the first display device;
  determining coordinates on the first widget where the user input was received;
  transmitting, to the first virtual display, an indication of: (i) the coordinates on the first widget where the user input was received, (ii) a type of the user input, and (iii) the unique identifier of the first widget, wherein the first virtual display is identified based on the association between the unique identifier of the first virtual display and the unique identifier of the first widget;
  mapping the coordinates on the first widget to corresponding coordinates on the GUI rendered on the first virtual display; and
  generating an input at the corresponding coordinates on the GUI rendered on the first virtual display, based on the user input;
generating, by the first application, an output responsive to the received user input;
transmitting, by the first virtual display to the first widget, the output; and
determining that a portion of the output is not visible on the first display device due to a size of the first widget;
increasing the size of the first widget to display, on the first display device, the output including the portion of the output that was not visible; and
refreshing the first widget to display the output on the first display device.

6. The system of claim 5, the operation further comprising:
receiving user input specifying a second portion of the GUI, different than the first portion of the GUI; and
providing a scrollbar on the first widget which allows a user to scroll between the first portion of the GUI and the second portion of the GUI, wherein the first widget is of a size that is smaller than a collective size of the first portion of the GUI and the second portion of the GUI.

7. The system of claim 5, the operation further comprising:
determining that the received user input is associated with a first rule, of a plurality of rules for the first widget;
determining that the first rule is associated with a first response, wherein the first response specifies to:
  minimize the first widget such that the first widget is not displayed on the first display device; and
  display the GUI of the first application on the first display device.

8. The system of claim 5, the operation further comprising:
receiving input specifying a first portion of a GUI of a second application, wherein the GUI of the second application is outputted on the first display device;
rendering the GUI of the second application on a second virtual display, and not on the first display device;
generating a second widget which displays the first portion of the GUI of the second application on the first display device, wherein a unique identifier of the second widget is associated with a unique identifier of the second virtual display; and
outputting the first and second widgets on a second display device, wherein the second display device is of a second system, communicably coupled to the system.

9. A computer program product, comprising:
a computer-readable storage medium having computer-readable program code embodied therewith, the computer-readable program code executable by one or more computer processors to perform an operation comprising:
  receiving input specifying a first portion of a graphical user interface (GUI) of a first application executing on a first computing device, wherein the GUI is outputted on a first display device and wherein the specified first portion excludes at least one component of the GUI;
rendering the GUI of the first application on a first virtual display of the first computing device;
removing, based on the rendering, the GUI of the first application from the first display device; and
generating a first widget which displays the first portion of the GUI of the first application on the first display device;
associating a unique identifier of the first widget with a unique identifier of the first virtual display:
upon receiving user input on the first widget displayed on the first display device;
determining coordinates on the first widget where the user input was received;
transmitting, to the first virtual display, an indication of: (i) the coordinates on the first widget where the user input was received, (ii) a type of the user input, and (iii) the unique identifier of the first widget, wherein the first virtual display is identified based on the association between the unique identifier of the first virtual display and the unique identifier of the first widget:
mapping the coordinates on the first widget to corresponding coordinates on the GUI rendered on the first virtual display; and
generating an input at the corresponding coordinates on the GUI rendered on the first virtual display, based on the user input;
generating, by the first application, an output responsive to the received user input;
transmitting, by the first virtual display to the first widget, the output; and
determining that a portion of the output is not visible on the first display device due to a size of the first widget;
increasing the size of the first widget to display, on the first display device, the output including the portion of the output that was not visible; and
refreshing the first widget to display the output on the first display device.

10. The computer program product of claim 9, the operation further comprising:
receiving user input specifying a second portion of the GUI, different than the first portion of the GUI; and
providing a scrollbar on the first widget which allows a user to scroll between the first portion of the GUI and the second portion of the GUI, wherein the first widget is of a size that is smaller than a collective size of the first portion of the GUI and the second portion of the GUI.

11. The computer program product of claim 9, the operation further comprising:
- receiving input specifying a first portion of a GUI of a second application, wherein the GUI of the second application is outputted on the first display device;
- rendering the GUI of the second application on a second virtual display, and not on the first display device;
- generating a second widget which displays the first portion of the GUI of the second application on the first display device, wherein a unique identifier of the second widget is associated with a unique identifier of the second virtual display; and
- outputting the first and second widgets on a second display device, wherein the second display device is of a second computing device, communicably coupled to the first computing device.

\* \* \* \* \*